Aug. 18, 1953
C. H. PARSONS ET AL
2,649,090
RUBBER CLOSURE FOR PHARMACEUTICAL VIALS
Filed Sept. 29, 1950
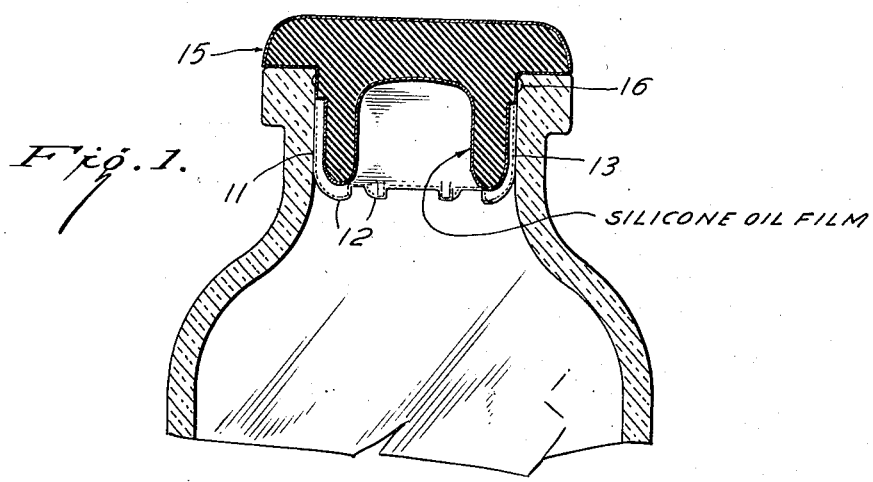
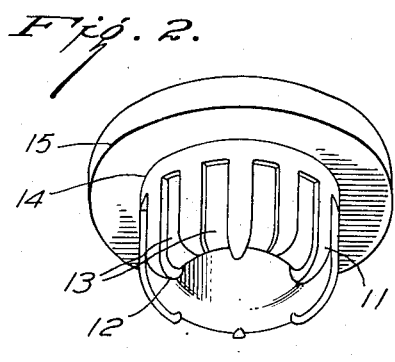
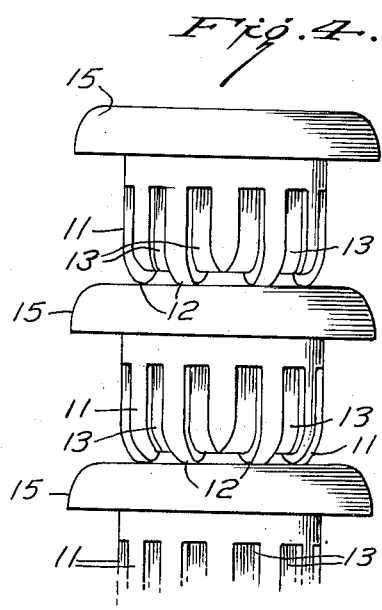
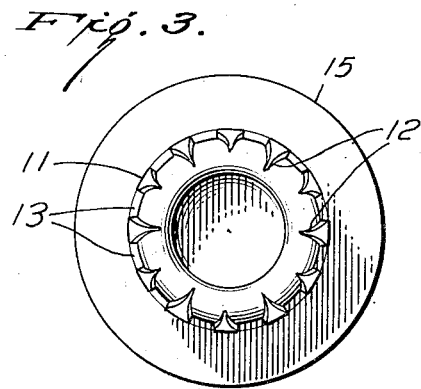
INVENTORS
CARR HARLAN PARSONS,
WALTER JOHN RUMPF,
BY
Samuel Branch Walker
ATTORNEY Patented Aug. 18, 1953

2,649,090

UNITED STATES PATENT OFFICE 2,649,090

RUBBER CLOSURE FOR PHARMACEUTICAL VIALS

Carr Harlan Parsons, Orangeburg, and Walter John Rumpf, Pearl River, N. Y., assignors to American Cyanamid Company, New York, N. Y., a corporation of Maine Application September 29, 1950, Serial No. 187,538

5 Claims. (Cl. 128—272)

This invention relates to a method of treating rubber stoppers for pharmaceutical containers with a silicone oil, and a rubber stopper as so produced. It relates particularly to a ribbed rubber stopper possessing particular configurations and lubricant properties that render it satisfactory for use in automatic stoppering machines.

It is an object of our invention to provide rubber stoppers which have outstanding ribs on the lower portion of their plug portions so that the stoppers may be partially inserted into vials and still permit communication into the vials; and to provide rubber stoppers with projecting tips so that the stoppers may be stacked without sticking and without dead spaces; to provide a lubricant for these rubber stoppers so that their tendency to stick to each other is reduced; to provide a surface sealing substance on the rubber stoppers to render the rubber more inert towards the contents of the vials; to reduce the permeability of the rubber stoppers to moisture; to provide a coating which will cause the contents of the vial to drain from the stopper; to reduce foaming; and to provide a lubricant which will allow the rubber stoppers to be more easily inserted and withdrawn.

The above and other advantages will be apparent from the accompanying description.

There has been a tendency for conventional rubber stoppers to stick to the glass rendering it difficult to insert or remove the stoppers. They absorb moisture which is released into the interior of the vial causing deterioration of moisture-sensitive substances, such as penicillin. They stick to adjacent rubber closures during sterilization procedures, which has rendered the use of automatic stoppering machines difficult, and complicates sterile handling.

In the past, paraffin or a talc has been used to prevent sticking. The disadvantages of talc or paraffin are obvious.

We have found that the use of an oily silicone renders the stoppers more impermeable to moisture, renders them less apt to absorb moisture in treatment, and prevents them from sticking.

Various types of siliceous oils may be used. Certain such oils are described in Patent 2,384,384 to McGregor, et al., "Polymeric Silicone and Methods of Making It." Other such materials are described in Haas, 2,470,772, "Method of Reducing the Adhesion of Ice to Rubbery Surfaces." Other siliceous oils are described in texts such as "Introduction to the Chemistry of the Silicones," Eugene G. Rochow, John Wiley & Sons, Inc., New York 1946, and elsewhere.

For our purposes, it is desired that the silicone coating remain oily at least until the rubber stopper is inserted in the vial. Polymerizable silicone fluids may be used provided that they do not unduly polymerize under the conditions of treatment prior to the insertion of the stopper in the vial. The polymeric oils such as are used for lubricants and hydraulic fluids and which are unaffected by heat or cold generally are the most satisfactory.

The silicone coating for the rubber stopper is most conveniently applied in solution. 2% of the silicone in a solvent such as chloroform, acetone, isoamyl alcohol, benzene, carbon tetrachloride, ethyl acetate, petroleum ether, propyl ether, etc. is satisfactory. Any solvent for the silicones may be used which does not deleteriously affect the rubber stopper, and is sufficiently volatile to be removed. The above solvents are recited by way of example only and not by way of limitation as other ketones, alcohols, aliphatic compounds, aromatic compounds, ethers, esters, etc. may be used. We prefer to use a fairly dilute solution, usually from 1 to 2% of the silicone in the solvent. Less than 1% may give an unduly thin coating, particularly with the more fluid solvents, and more than 2% usually gives a thicker coating than is necessary, and uses an undesirably large quantity of the expensive silicone. More concentrated solutions may be used, and even the pure silicone fluid itself, but the thicker coating obtained is not needed and uses an uneconomically large amount of the fluid.

The time and the temperature of immersion of the stoppers in the solution is not critical. It is convenient to coat the stoppers at room temperature. An immersion of a few minutes is usually adequate to allow complete coating of the stoppers and yet not waste time. If the stoppers have recesses in them, it is desirable that the stoppers be tumbled while draining to prevent liquid accumulating in the recesses. The solvent may be allowed to evaporate and the stoppers then used. More desirably, however, for pharmaceutical work, the stoppers are sterilized. The silicone fluids retain their lubricant properties during sterilization. A standard sterilizing treatment of 10 hours at 110° C. is sufficient to render the coated stoppers sterile without deleteriously affecting them. Other convenient sterilizing cycles may be used.

Our coating may be advantageously used on any size and shape of rubber closure.

A stopper which is particularly effective for automatic stoppering machines and vacuum closures is shown in the drawings.

In the drawings:

Figure 1 shows a silicone coated rubber closure in a small glass vial in section.

Figure 2 is a pictorial view of the silicone coated rubber stopper showing ribs on the lower portion of the plug and outstanding feet formed integral with the ribs.

Figure 3 is a view of the bottom of such a rubber stopper.

Figure 4 shows the rubber stoppers stacked.

For sterile sealing of vials, it is particularly convenient to use automatic stoppering machines. For use in such machines, it is convenient that they be sterilized while stacked. It is very convenient to use a rubber stopper having ribs as is shown. In Figure 2 is shown a puncturable rubber stopper which may be used in small vials. This stopper is different from the conventional stopper, in that it has ribs 11 on its surface certain of which are provided with feet 12 which project below the main lower portion of the stopper. Between the ribs are vent slots 13. These vent slots extend part way up the side of the plug, but near the top of the plug has a cylindrical portion as shown at 14 over which the skirt 15 extends. The feet 12 permit the plugs to be stacked with only small areas in contact as shown in Figure 4. A stack of plugs may be sterilized and fed to an automatic stoppering machine. The small area in contact permits more complete and quicker sterilization, permits steam or dry air which is being used for sterilization to have a more ready access to all surfaces of the stopper, and the ribs serve as guides during the stoppering operation. The ribs 11 permit the rubber stopper to be partially inserted in the vial and still permit the contents of the vial to communicate with the outside. This permits the partial insertion of the rubber stoppers by machine, permits the enclosure of the vial with the stopper partially inserted in a chamber from which air may be evacuated, and by a simple pressure on the top of the stopper, the vial is readily sealed, under vacuum. Inert atmospheres can easily be introduced.

The combination of the stopper of this particular shape with a silicone lubricant on its surface renders the use of automatic stoppering machines commercially practical and justifies full confidence in the automatic processing of the bottles.

Many glass vials have a slight rim 16 on the inside adjacent the top of the neck which is formed during the molding operation. This rim cooperates particularly effectively with the full cylindrical portions of the plug 14 in providing an adequate closure.

The rubber stopper may be then fastened into the glass container by an aluminum seal or other standard type of seal. Such seals are well known to those skilled in the art.

The stopper may be of a synthetic rubber or plastic designed to be substituted for rubber in such closures, and such rubber substitutes are included within the scope of the term "rubber closure" as used in the appended claims.

*Example 1*

400 grams of the silicon oil sold commercially by Dow Corning as "DC–200 (100 centistokes)" was mixed with 19.6 liters of chloroform. A wire basket containing rubber plugs of the type shown in the drawings were immersed completely in the thus prepared silicon solution at room temperature for one minute with agitation. The wet plugs were removed, permitted to drain, and allower to air dry with occasional shaking. The plugs were then stacked in glass tubes of a size slightly larger than the rim size of the plug, and sterilized by heating in a dry oven for 10 hours at 110° C. The plugs were permitted to cool under sterile conditions and the thus filled glass tubes used as magazines for the feeding of the plugs to an automatic stoppering machine. The plugs fed without sticking and smoothly by gravity down the glass tubes through the machine and into the vials. The plugs were partially forced into the vials so as to permit the spaces between the ribs to serve as escape ports. The vials thus partially stoppered were placed in a vacuum chamber, evacuated, and the plugs forced into the fully closed position while still under vacuum. The stoppered vials were removed and an aluminum retaining seal placed thereon.

*Example 2*

A solution of a silicone oil was prepared by dissolving 10 grams of the G. E. silicone product 9996–300 in acetone. A small wire basket containing rubber stoppers of the type shown in Figure 1 was immersed therein, shaken to insure thorough wetting, promptly removed, and permitted to drain and dry. The plugs as thus treated were fed through an automatic stoppering machine into non-sterile vials and seals attached.

*Example 3*

A silicone solution may be prepared from dimethyl-di-ethoxy silicane prepared in accordance with the method described in the patent to McGregor et al., 2,384,384. 20 grams of a liquid thus prepared with a viscosity of about 100 Saybolt seconds may be dissolved in a liter of acetone and the rubber stoppers dipped therein long enough to insure their complete wetting, removed therefrom, and permitted to drain and air dry. The stoppers may be sterilized by treatment at 110° C. for about 10 hours and used to stopper pharmaceutical vials.

*Example 4*

Conventional rubber stoppers, i. e. those without ribs, were immersed for about 5 minutes in a solution of 20 grams of the silicone liquid known as Dow Corning "DC–200 (100 centistokes)" in a liter of isoamyl alcohol. The stoppers were permitted to drain and air dry, were then placed in glass magazines for a filling machine and sterilized for 10 hours at 110° C. The stoppers were fed through an automatic stoppering machine into pharmaceutical vials, placed in position and seals attached. When used in a vial containing an intravenous solution of aureomycin hydrochloride and sodium glycinate, the use of the lubricated stopper reduced foaming.

*Example 5*

The above example was repeated using benzene instead of isoamyl alcohol as a solvent. These stoppers prevented discoloration which frequently occurs with conventional rubber closures in a vial of pectinized procaine penicillin containing aluminum monostearate.

*Example 6*

Example 4 was repeated using carbon tetrachloride instead of isoamyl alcohol as a solvent.

Example 7

Example 4 was repeated using ethyl acetate instead of isoamyl alcohol as a solvent.

Example 8

Example 4 was repeated using petroleum ether instead of isoamyl alcohol as a solvent.

Example 9

Example 4 was repeated using propyl ether instead of isoamyl alcohol as a solvent.

Having thus described certain embodiments thereof, as our invention we claim:

1. A rubber closure for a pharmaceutical vial, consisting essentially of a puncturable rubber plug having ribs on its lower portion, feet extending below the main portion of the plug, and a coating of a moisture-resistant oily non-tacky silicone lubricant whereby the insertion of the closure into a vial is facilitated.

2. A rubber closure for a pharmaceutical vial comprising a puncturable rubber stopper having a skirt, a body portion having a substantially cylindrical portion and a ribbed portion, feet extending below the body portion having such a shape that when stacked the closures are in contact over small areas only, and a coating of a moisture-resistant, oily, non-tacky silicone lubricant whereby the insertion of the closure into a vial is facilitated.

3. A rubber closure for a pharmaceutical vial comprising a puncturable rubber stopper having a skirt, a body portion having a substantially cylindrical portion and a plurality of ribs extending from the cylindrical portion to at least adjacent the bottom of the body portion, said ribs being of such shape that the closure may be partially inserted in a vial and retained in such position while allowing free access of air into the vial, and a thin moisture-resistant, non-tacky layer of a silicone lubricating material whereby the insertion of the closure into a vial is facilitated.

4. A puncturable closure for a pharmaceutical vial comprising a resilient rubber stopper having a skirt, a hollow body portion comprising a substantially cylindrical portion and a plurality of ribs substantially contiguius with and extending below the said substantially cylindrical portion to at least adjacent the bottom of the body portion, said ribs being of such a shape that the closure may be partially inserted in a vial and retained in such position while allowing free access of air into the vial, and feet extending below the body portion and having a shape such that when stacked the closures are in contact over small areas only.

5. The stopper of claim 4 having thereon a coating of a moisture-resistant, oily, non-tacky silicone lubricant whereby the insertion of the closure into a vial is facilitated.

CARR HARLAN PARSONS.
WALTER JOHN RUMPF.

References Cited in the file of this patent

UNITED STATES PATENTS

| Number | Name | Date |
|---|---|---|
| 726,629 | Brown | Apr. 28, 1903 |
| 811,876 | Schroeder | Feb. 6, 1906 |
| 1,237,761 | Dwyer | Aug. 21, 1917 |
| 1,327,519 | Bitler | Jan. 6, 1920 |
| 1,587,167 | Marsden | June 1, 1926 |
| 2,353,674 | Kimber | July 18, 1944 |
| 2,470,772 | Haas | May 24, 1949 |
| 2,471,224 | Loughborough | May 24, 1949 |
| 2,474,704 | Thayer | June 28, 1949 |
| 2,573,637 | Bender | Oct. 30, 1951 |

FOREIGN PATENTS

| Number | Country | Date |
|---|---|---|
| 748,966 | France | Apr. 25, 1933 |
| 812,769 | France | Feb. 8, 1937 |